Aug. 14, 1934.  B. S. SNOW  1,970,202
WATER TREATING AND STORAGE APPARATUS
Original Filed Jan. 26, 1931  8 Sheets-Sheet 1

Fig.1.

Aug. 14, 1934.    B. S. SNOW    1,970,202
WATER TREATING AND STORAGE APPARATUS
Original Filed Jan. 26, 1931    8 Sheets-Sheet 3

Fig.3.

Inventor:
Barton S. Snow,
By Dyrenforth, Lee, Chritton & Wiles,
Attys.

Aug. 14, 1934.                B. S. SNOW                    1,970,202
                    WATER TREATING AND STORAGE APPARATUS
                    Original Filed Jan. 26, 1931      8 Sheets-Sheet 5

Inventor:
Barton S. Snow,
By Dyrenforth, Lee, Chritton & Wiles,
Attys.

Patented Aug. 14, 1934

1,970,202

UNITED STATES PATENT OFFICE 1,970,202

WATER TREATING AND STORAGE APPARATUS

Barton S. Snow, Wheaton, Ill., assignor to T. W. Snow Construction Company, Chicago, Ill., a corporation of Illinois Application January 26, 1931, Serial No. 511,368
Renewed January 10, 1934

13 Claims. (Cl. 210—10)

My invention relates to the chemical treatment of water to render it "soft" or clarify it, as for example to better adapt it for use in boilers.

One of my objects is to provide a construction of water-treating apparatus of the type in which the flow of raw water to the apparatus effects automatic operation of the chemical-supplying means, wherein the chemicals are supplied to the raw water to be treated concurrently with the flow of raw water to the apparatus and in direct proportion to the rate of such flow.

Another object is to avoid the accumulation of air in the mixture of the chemical and water supplied to the raw water for the treatment of the latter which commonly occurs where the water for mixture with the chemical or the mixture of water and chemical, drops through the air.

Another object is to provide for the mixture of the raw water to be treated and the chemical solution, with the minimum delay after producing the solution thereby to minimize the amount of chemicals required and produce more effective results, inasmuch as chemicalization takes place much more effectually in the nascent state.

Another object is to provide improvements in water treating apparatus employing means for producing the chemical solution by the automatic feeding of the chemicals in dry condition as the same are required, to the end that such apparatus may be better adapted for producing uniformly treated water under variations in the rate of flow of raw water to the apparatus; and other objects as will be manifest from the following description.

Referring to the accompanying drawings:

Figure 6 is an enlarged plan sectional view taken at the line 6 on Fig. 4 and viewed in the direction of the arrow.

Figure 6a is a broken view in side elevation of the pipe through which the raw water flows to the treating tank, a part of the tank being broken away and shown as equipped with electric-switch controlling means by which the chemical feeding means are controlled responsive to flow of water through said pipe.

The apparatus shown comprises a cylindrical tank 17, shown as supported in accordance with common practice, on a sub-structure 18 shown as comprising a hollow column which forms a housing for various parts of the structure hereinafter described, the tank 17 containing a cylindrical tank represented at 19 which is preferably centrally located in the tank 17 and of such relatively small size as to form with the tank 17, an annular clear-water-storage compartment 20.

The tank 19 communicates at its upper portion with the lower portion of the compartment 20 as through the pipes represented at 21, these pipes being formed of vertical pipe portions 22 located within the compartment 20 and horizontally extending pipe portions 23 which are located at the upper ends of the vertical portions 22 and project through openings into this tank preferably to a point adjacent the center of the latter. By preference four of the pipes 21 are provided each spaced from the adjacent one thereof at an angle of substantially 90° with the horizontal portions 23 radiating from the vertical center of the tank 19. The purpose of the pipes 21 is to conduct clarified treated water from the tank 19 into the lower portion of the compartment 20.

The apparatus shown being provided for the supplying of locomotive tenders with treated water, is provided with a water conducting pipe 24 located in the compartment 20 and swiveled at 25 to a pipe 26 into which it opens. The extremity of the pipe 24 is connected with a float 27 in the compartment 20 which serves to maintain the inlet of the pipe 24 at all times close to the upper surface of the clear water in the compartment 20.

The pipe 26 is equipped with any suitable valve mechanism for controlling the flow of the water therefrom, the valve-controlling means of the construction shown comprising a lever 28 fulcrumed at 28a on a stationary part of the structure and having a pull chain 29 at one end, the lever 28 being connected between its ends with a valve-actuating rod 30 shown as extending downwardly through an upwardly extending tubular extension 31 of the pipe 26.

Figure 1:
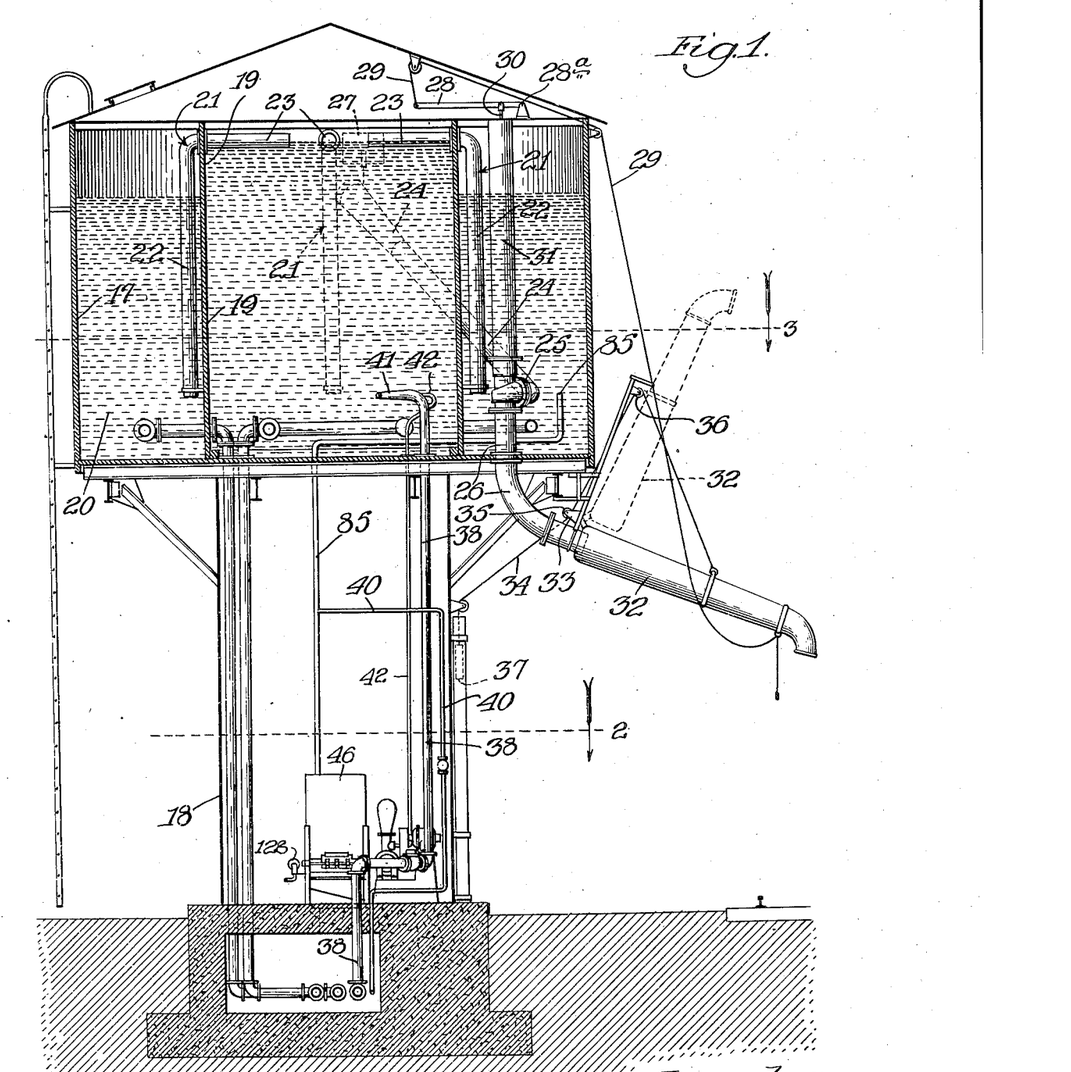
Figure 1 is a view in vertical sectional elevation of a combined water treating and clear water storage apparatus constructed in accordance with my invention, the section being taken at the irregular lines 1—1 on Figs. 2 and 3 and viewed in the direction of the respective arrows.
Figure 2:
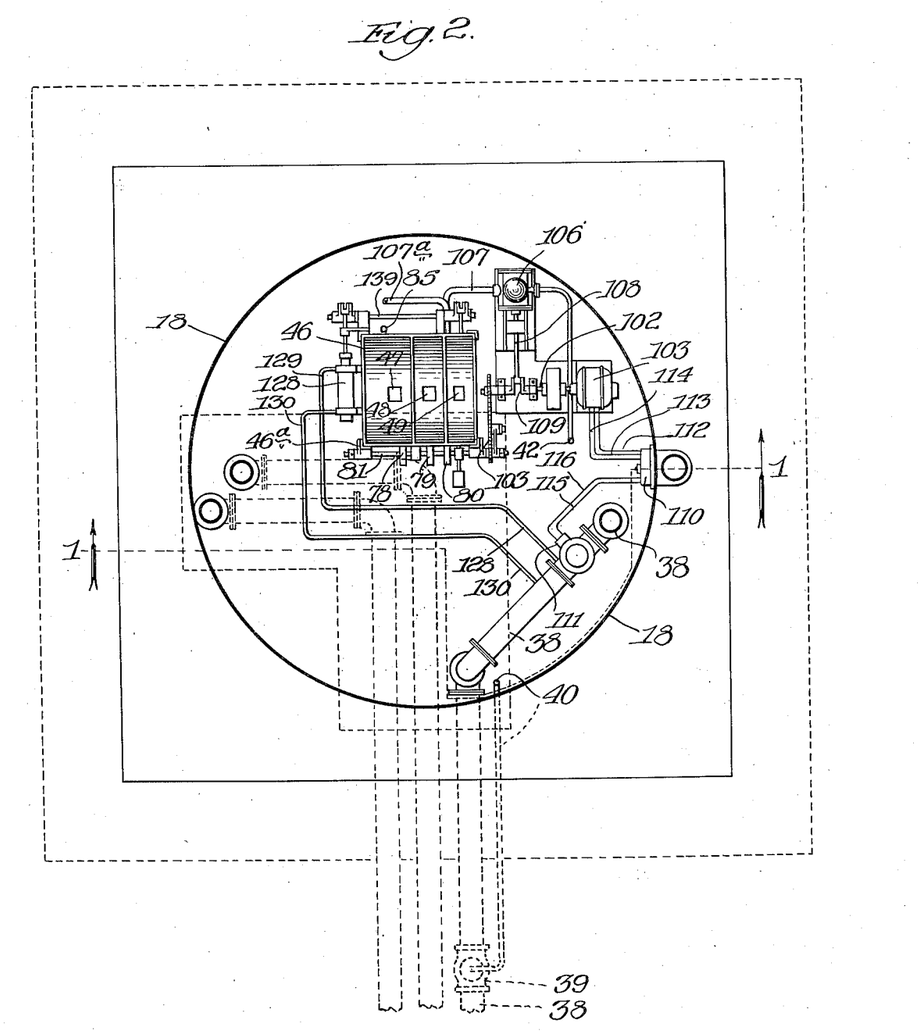
Figure 2 is a plan sectional view of the apparatus, the section being taken at the line 2—2 on Fig. 1 and viewed in the direction of the arrow.
Figure 3:
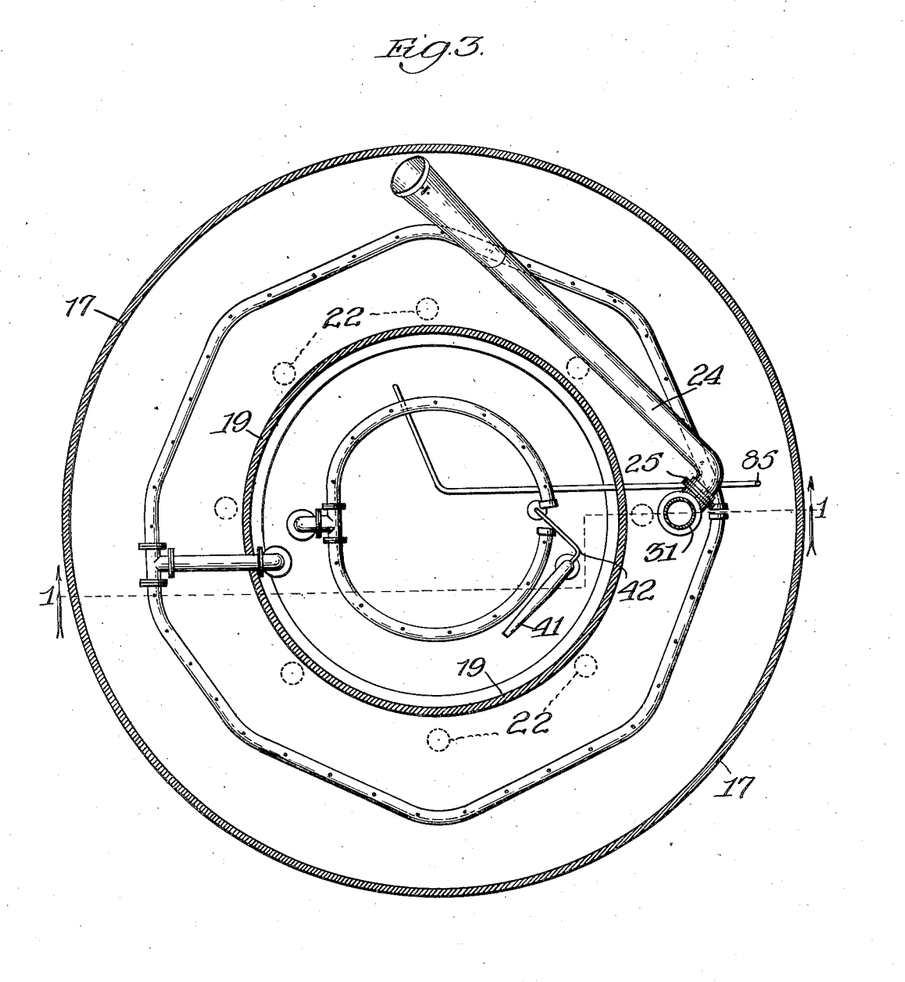
Figure 3 is a plan sectional view of the apparatus, the section being taken at the line 3 on Fig. 1 and viewed in the direction of the arrow.
Figure 4:
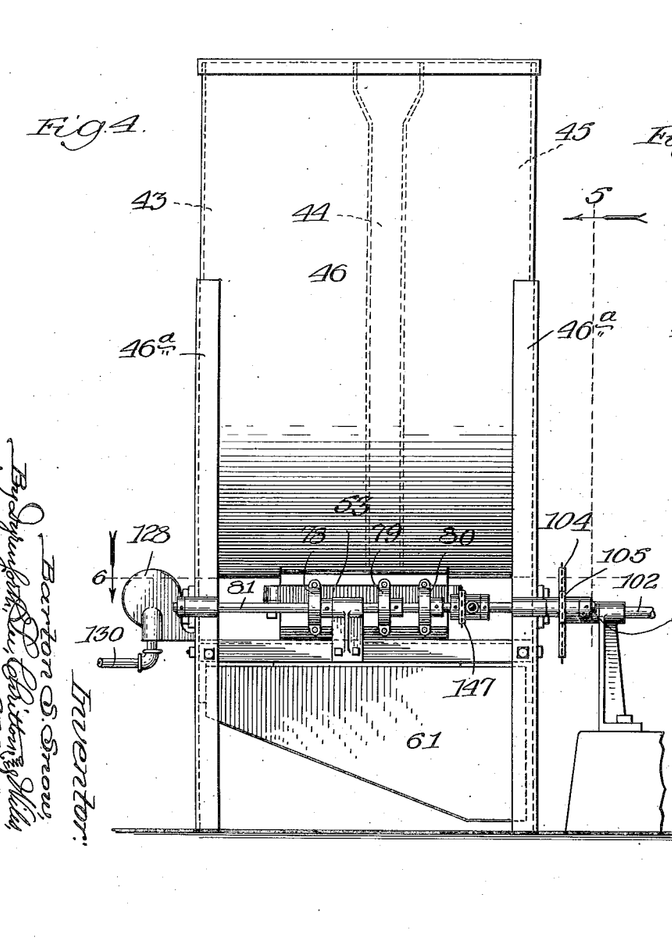
Figure 4 is a view in end elevation of the dry chemical hopper and feed mechanism forming elements of the apparatus.
Figure 5:
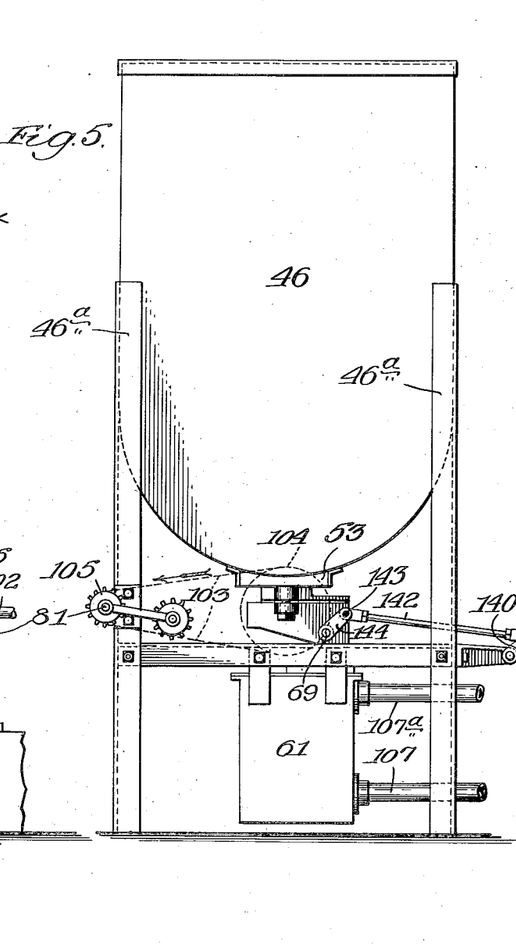
Figure 5 is a similar view of the same apparatus viewed at the line 5 on Fig. 4 and in the direction of the arrrow.

The pipe 26 extends downwardly through the bottom of the tank 17 and cooperates with a spout 32 pivoted at 33 on a stationary part of the apparatus which permits the spout 32 through which the treated water is delivered to the locomotive tender, to be swung from the dotted position represented in Fig. 1, the position occupied by the spout when the apparatus is not in use, to the full line position shown in this figure, which is the position occupied by the spout when water is to be discharged into a tender. The spout 32 is shown as counterweighted by a cable 34 connected at one end with the outer end of the spout 32 and extending over stationarily supported pulleys 34 and 36, the opposite end of the cable 34 being provided with a counterweight 37.

The pipe through which the raw water is supplied to the tank 19 is represented at 38 and communicates, under valve control, with a source (not shown) of water under pressure, as for example a city water service main.

Any suitable means for controlling the flow of water into the tank 19 may be provided as for example a common form of altitude valve represented at 39 interposed in the pipe 38. Such valves, as is well known, comprise a pipe, such as for example the pipe shown at 40, which communicates with a pipe hereinafter described for leading treated water to the chemical mixer of the apparatus from the compartment 20, and through which pipe the head pressure produced by the water in tank 19 is exerted on the altitude valve, this valve operating when the water in the tank 19 drops below a predetermined level to open the valve 39 and permit water to flow through the pipe 38 and to shut off the flow of water through the pipe 38 when the water in tank 19 rises above such predetermined level.

The outlet end of the pipe 38 is provided with a nozzle 41 shown as extending substantially horizontally in the lower portion of the tank 19 adjacent the side wall of this tank and so disposed as shown that the water discharges from the nozzle tangentially of the side wall of this tank whereby the discharging water causes the body of water in the tank 19 to swirl therein in clockwise direction.

The water-treating material which is supplied to the water in the tank 19 also enters the water at the lower portion of this tank preferably through a pipe 42 which extends into the nozzle 41 through a side of the latter, with its terminal end centrally disposed in the nozzle in spaced relation to the walls of the latter and projecting slightly beyond the outlet end of the nozzle, as shown in my pending application for United States Letters Patent Serial No. 348,753 filed March 21, 1929, whereby the water discharging through the nozzle 41 surrounds a core, so to speak, of the water treating material.

The chemicals with which the water is to be treated are supplied to the apparatus in dry, relatively fine, condition, the apparatus to this end being provided with hopper compartments from which the chemicals in measured quantities are discharged to the means for mixing them with water and from which the mixture discharges into the pipe 42.

In the arrangement shown the water-treating chemicals, by way of example dry lime, sodium aluminate, and dry soda, are charged into hopper compartments 43, 44 and 45, respectively, of a hopper structure 46 supported in raised position on a sub-structure 46a.

The hopper compartments 43, 44 and 45 have separate outlets 47, 48 and 49 arranged in line, and formed in part, as shown, of passages 50, 51 and 52, respectively, in a casting 53 secured to the underside of the hopper structure 46.

Figure 15:
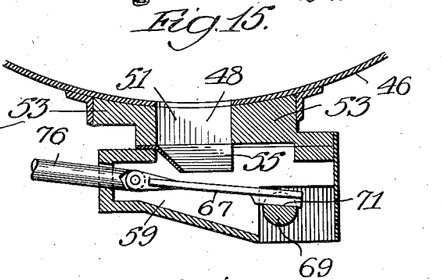
Figure 15 is a sectional view taken at the line 15 on Fig. 14 and viewed in the direction of the arrow.
Figure 16:
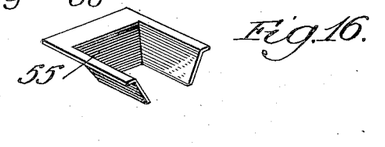
Figure 16, a perspective view of one of the similar hopper spouts through which the chemicals discharge to the spray pan.

The lower ends of the outlets 47, 48 and 49 are provided with trough members 54 (Figs. 9, 15 and 16), each presenting a bottom wall 55 which slopes downwardly, the walls 55 extending part way across the discharge outlets 47, 48 and 49, as shown. The members 54 are shown as held in place by a member 56 below them bolted at 57 to the member 53 and having crosswise channels 58, 59 and 60 on its upper side which register with the outlets 47, 48 and 49, respectively, and into which the sloping trough-bottoms 55 extend.

Figures 7, 8:
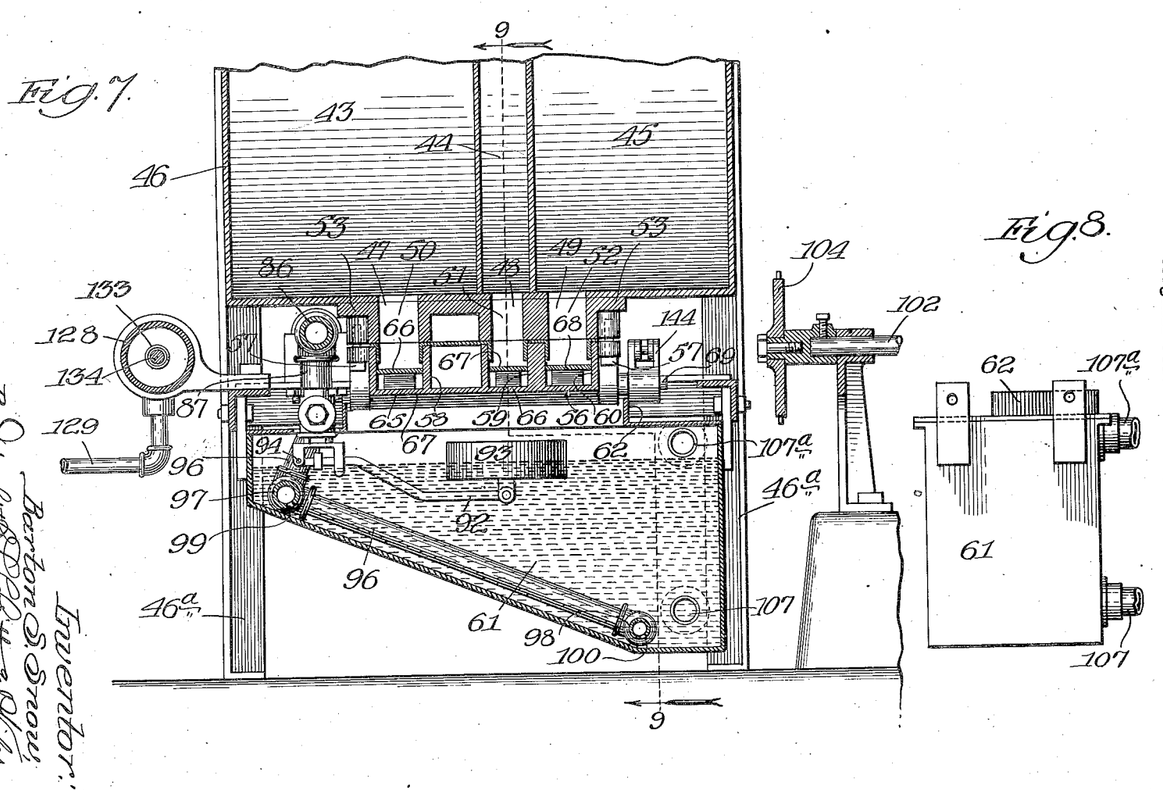
Figure 7 is a view in sectional elevation of the mechanism of Fig. 4, this view being taken at the line 7 on Fig. 6 and viewed in the direction of the arrow.
Figure 8 is a view in elevation of a spray pan forming an element of the apparatus.
Figures 9, 9A:
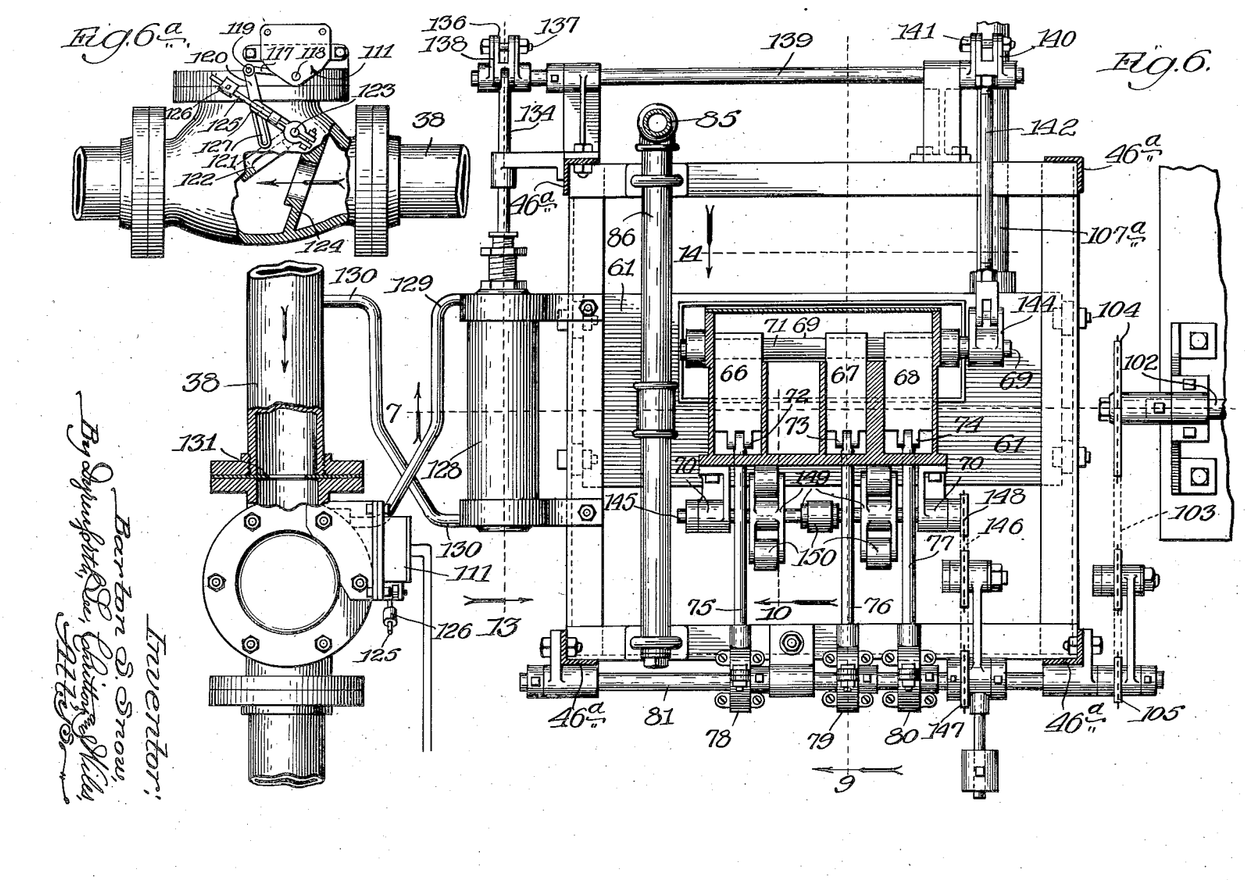
Figure 9 is a section taken at the irregular line 9—9 on Fig. 7 and on the line 9 of Fig. 6 and viewed in the direction of the respective arrows.

Below the hopper structure and the members 53 and 56 is a spray pan 61 its open top, flanged as represented at 62, being in vertical alinement with the member 56 (Figs. 7 and 9) at the open ends of the channels 58, 59 and 60, the bottoms of which, represented at 63, 64 and 65, respectively, incline downwardly toward the pan 61 (Fig. 9).

Cooperating with the hopper structure are means for feeding the dry chemicals from the several hopper compartments, these means comprising feeder plates 66, 67 and 68 for the hopper outlets 47, 48 and 49, respectively, located, and reciprocable in, the channels 58, 59 and 60, respectively. The forward ends of the plates 66, 67 and 68 which extend beneath the outlets 47, 48 and 49 in vertically spaced relation thereto, extend crosswise of, and rest on, a shaft 69 oscillatorily mounted in brackets 70 secured to the member 56, the shaft 69 having a flat portion 71 for a purpose hereinafter described.

The rear ends of the plates 66, 67 and 68 are pivotally connected at 72, 73 and 74, respectively, with the forward ends of rods 75, 76 and 77, respectively, which are reciprocable through openings in the member 58 and carry at their rear ends bands 78, 79 and 80, respectively, which surround double eccentrics supported on a shaft 81 journalled on a stationary part of the apparatus. The double eccentrics which cooperate with the bands 79, and which are the same for each of the bands, comprise an inner eccentric 82 rigid on the shaft 81 and an outer eccentric 83 surrounding the eccentric 82 and about which the band 79 extends, the eccentric 83 being in the form of a washer split crosswise thereof and secured together in clamped condition about the eccentric 82 to rotate therewith, as by bolts 84, the double eccentric structure thus provided permitting, by virtue of the adjustment of the eccentric 83 into different annular positions about the eccentric 82, the adjusting of the length of stroke imparted to the feeder plates by the rotation of the shaft 81, it being possible by the construction shown to so adjust the eccentric 83 that the feeder plates will not be reciprocated in the rotation of the shaft 81.

It will thus be understood from the foregoing that by driving the shaft 81 and thus the rods 76, the feeder plates 66, 67 and 68 are reciprocated back and forth below the hopper outlets 47, 48 and 49 and thus serve to feed the chemicals in measured quantities from the hopper compartments, the amount of chemicals fed upon each reciprocation of the plates depending upon the elevation of their forward ends (determined by the angular position of the shaft 69) and the length of stroke of these plates by the eccentric adjustments above referred to.

Figures 9, 10, 11, 12:
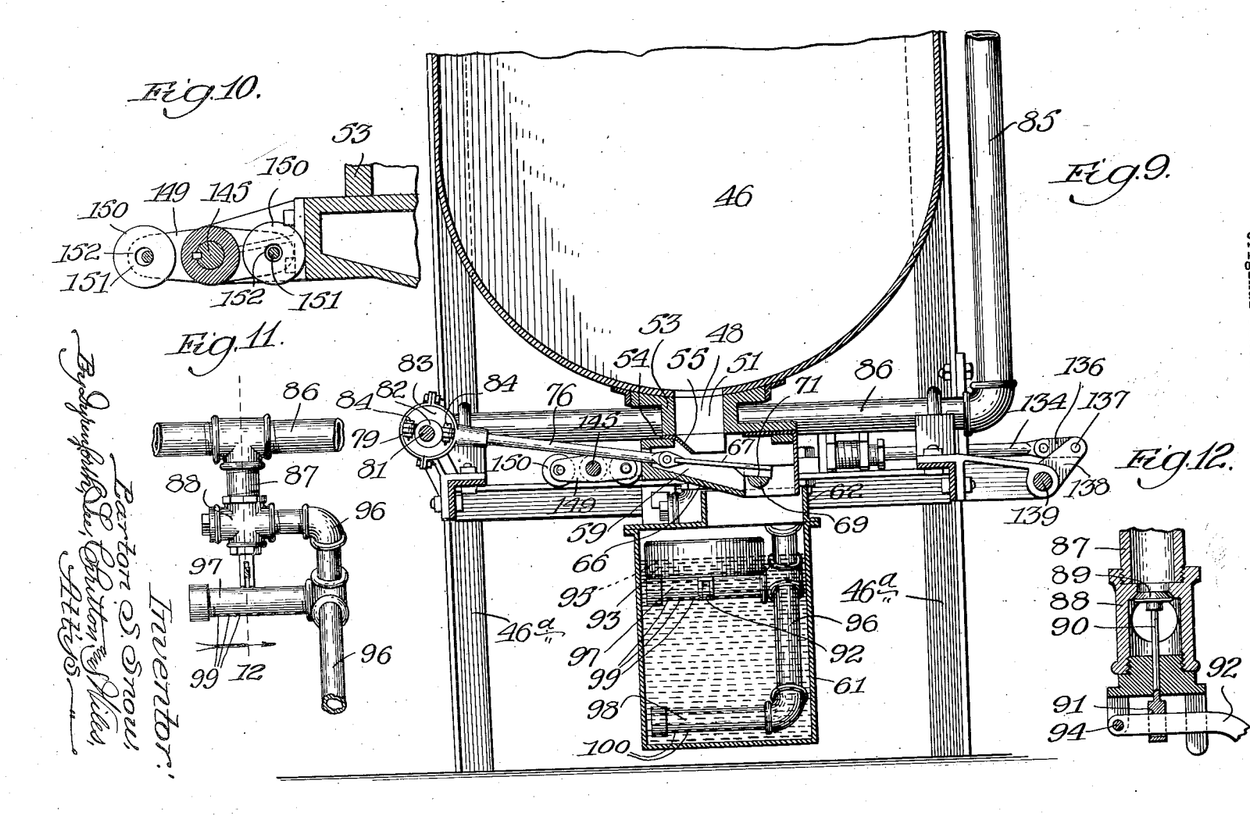
Figure 10 is a broken enlarged section taken at the line 10 on Fig. 6 and viewed in the direction of the arrow, this view showing the vibrator device for vibrating the dry-chemical hopper structure to insure the feeding of the chemicals therefrom.
Figure 11 is a broken plan view of a portion of the piping employed for delivering treated water to the spray pan for mixture with the chemicals.
Figure 12 is a sectional view taken at the line 12 on Fig. 11 and viewed in the direction of the arrow.

The apparatus also comprises means for supplying water to the spray pan 61 for mixture with the chemicals fed to this pan, as stated, the water being preferably treated water. These means comprise a pipe 85 hereinbefore referred to and in communication with the pipe 40, the pipe 85 opening at its upper end into the compartment 20 below the level reached by the water in this tank in the normal use of the apparatus, this pipe communicating with a pipe 86 extending crosswise of, and above, the spray pan 61 and having a depending pipe portion 87 opening into the casing 88 of a valve device the valve of which (Fig. 12) represented at 89 is provided with a depending stem 90 through an opening 91 in which extends the lever 92 of a float device, the float of which is represented at 93 and is located in the spray pan 61, the lever 92 being fulcrumed at 94 on a stationary part of the apparatus. The float just referred to operates when the water on which it floats lowers to a predetermined point to open the valve 89 and when the water rises to said point to close this valve thereby maintaining water in the pan 61 at the level indicated at 95.

The outlet of the valve casing 88 connects with a pipe 96 of angle shape which extends along the bottom of the pan 61 lengthwise of the latter at one side of the pan, lateral pipes 97 and 98, each of which open at one end into the pipe 96, extending crosswise of the pan 61 and adjacent the upper and lower edges of the bottom thereof containing apertures 99 and 100, respectively, along their lengths for jetting the water into the pan. Thus jetting the water causes the body of water maintained in the pan to be thoroughly mixed with the chemicals discharged into the pan from the hopper compartments.

In the construction shown the shaft 81 is operated to actuate the feeder plates 66, 67 and 68 simultaneously with the flow of water through the pipe 38 and is continued in operation so long as the water is fed to the tank 19 through the nozzle 41 and the liquid mixture of water and chemical in the spray pan 61 is forced through the pipe 42 for discharge into the tank 19, by means comprising an electric motor 101 the starting and stopping of which is effected responsive to the flowing of water through the pipe 38 and the arrestation of the flow, respectively. The shaft 102 of the motor 101 is operatively connected with the shaft 81 for driving the latter, by means of a sprocket chain 103 engaging sprockets 104 and 105 on the shafts 102 and 81, respectively, whereby the shaft 81 rotates with the motor 101.

The motor 101 operates a pump represented at 106 and shown as of the reciprocating piston and cylinder type the inlet of which connects by a pipe 107 with the bottom of the pan 61 and the outlet of which connects with the pipe 42, the piston of the pump being shown as driven by a pitman 108 connected with a crank 109 on the motor shaft 102. An overflow pipe 107ª serves to conduct the liquid in the pan 61 to a suitable point of discharge in case of overflow of the pan.

The starting and stopping of the motor 101 responsive to the flow of water through the pipe 38 is effected by means of switch devices 110 and 111, the switch device 110 being shown as of the common push button motor starter type and having the usual electrical circuit connections with the motor 101 through the wires 112, 113 and 114. The portion of the switch device 110 which is commonly operated by the push button has wires 115 and 116 leading therefrom to the switch device 111 which in opening and closing effects the conditioning of the switch 110 in the same way as in the case of the operation of the switch 110 by the push button.

The switch device 111 is so constructed that when water starts to flow through the pipe 38 this switch will close and through the switch 110 start the motor 101 into operation and when the water ceases to flow in pipe 38 the switch 108 will open, thereby conditioning the switch 110 to break the circuit through the motor 101.

The switch 111, according to the particular illustrated embodiment thereof, comprises a movable and a stationary electrical contact (not shown), the movable contact being operatively connected with a lever 117 pivoted at 118 on the case of the switch 111 and having its outer end pivoted at 119 to the upper end of a link 120 slotted as represented at 121. The switch mechanism also comprises a plate 122 in the pipe 38 and secured to a rock shaft 123, this plate cooperating with a fixed ported partition 124 in the pipe 38. The shaft 113 has an arm 125 provided with a weight 126 adjustable therealong and a stud 127 which extends into, and is movable along, the slot 121.

When water is flowing through the pipe 38 the plate 122 is rocked by the water pressure to the position shown in Fig. 6a in which the switch 111 is closed and thus current flows to the motor 101. When water ceases to flow through pipe 38 the pipe 122 swings into engagement with the partition 124 thereby rocking the lever 117 to switch-open position.

As will be understood from the foregoing, the feeder plates 66, 67, 68 are operated at a uniform speed and the strokes of these plates manually adjusted by the means described and comprising the eccentric devices 82, 83 and 84 to feed the proper amount of each chemical according to the character of the water to be treated. However, as the rate of flow of raw water to the apparatus usually varies it is necessary that means be provided for varying the feed of the chemicals according to the rate of flow of the raw water so that the proper amounts of chemicals will be delivered to the raw water for effecting the proper treatment thereof.

In the construction shown means are provided for thus regulating the feed of the chemicals, these means, which operate automatically to so regulate the feed of the chemicals, comprising a cylinder 128 communicating at its opposite ends with pipes 129 and 130, respectively, which open into the pipe 38 at opposite sides, respectively, of an orifice plate 131 in this pipe, the cylinder 128 containing a piston 132 spring pressed toward the high pressure side of the cylinder by a coil spring 133, the stem 134 of the piston being pivoted at 135 to a link 136 which latter is pivoted at 137 to a crank 138 on a rock shaft 139 journalled on a stationary part of the apparatus. The shaft 139 is provided with another crank 140 pivoted at 141 to a link 142, the other end of this link being pivoted at 143 to a crank 144 on the shaft 69.

Figure 13:
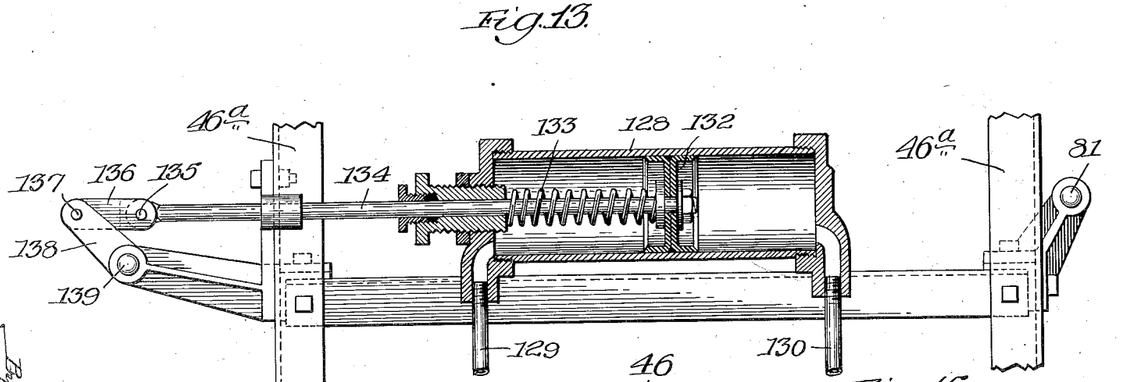
Figure 13 is a sectional view taken at the line 13 on Fig. 6 and viewed in the direction of the arrow.
Figure 14:
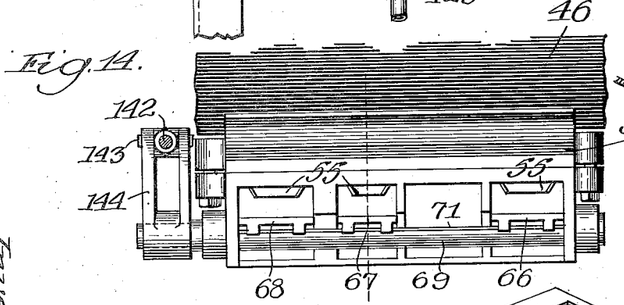
Figure 14 is a sectional view taken at the line 14 on Fig. 6 and viewed in the direction of the arrow.

The parts described are so constructed and arranged as shown that when the maximum differential of pressure exists in the pipes 129 and 130, the piston 132 will be forced, against the resistance of the spring 133, to the left in Fig. 13 to the position shown in this figure and the flat portion 71 of shaft 69 will be uppermost and thus the feeder plates 66, 67 and 68 will extend in their lowermost positions (Fig. 9). As the pressure differential in the pipes 129 and 130 becomes reduced by reduction of flow of the raw water in the pipe 38, the shaft 69 will be automatically rocked to raise the ends of the feeder plates in proportion to the decrease in flow of the raw water in pipe 38 and thus proportionately reduce the amounts of chemicals fed to the spray pan. Thus by the adjustment of the strokes of the feeder plates and the automatic controlling of the heights to which the outer ends of these plates extend, the administration of the dry chemicals to the spray pan and thus to the raw water, may be caused to be in direct proportion to the flow of the raw water to the apparatus.

To avoid the possibility of "hanging up" of the chemicals in the hopper compartments, means for vibrating the hopper structure are provided the means shown for this purpose comprising a shaft 145 (Fig. 10) journalled on a stationary part of the apparatus and shown as driven by a sprocket chain 146 engaging sprockets 147 and 148 on the shafts 81 and 145, respectively, the shaft 145 being provided with bifurcated cross arms 149 in which rollers 150 are mounted for rotation at stub shafts 151 thereon, these stub shafts extending loosely through openings in the arms of the cross members, one of these openings being shown at 152. These parts are so positioned as shown that in the rotation of the shaft 145, the rollers 150 successively strike against the hopper structure thus jarring it.

While means are shown and described for driving the feeder plates and adjusting their strokes, it will be understood that in the treatment of waters of certain qualities requiring small proportions only of chemicals, the desired flow of chemicals may be obtained merely by the feed resulting from the jarring of the hopper structure as stated under the control of the mechanism for regulating the height at which the feeder plates extend, in which case the eccentric devices for the feeder plates 81—84 will be so adjusted that no stroke is imparted to the feeder plates.

While I have illustrated and described a particular construction embodying my invention I do not wish to be understood as intending to limit it thereto as the same may be variously modified and altered without departing from the scope thereof.

What I claim as new and desire to secure by Letters Patent, is:

1. In water-treating apparatus, the combination of a receptacle for a dry chemical, means adjacent the outlet from the receptacle moving at a fixed rate of speed for feeding the chemical from said receptacle, a conduit to conduct water to the apparatus, and pressure responsive means communicating with said conduit and operated by changes in rate of flow therein, acting to vary the rate of delivery of chemical from said feeding means.

2. In water-treating apparatus, the combination of a receptacle for a dry chemical, a feeder-plate reciprocable across the outlet of said receptacle and movable toward and away from said outlet, means for reciprocating said plate at a fixed rate of speed, and means operating responsive to the rate of flow of water to the apparatus for varying the height at which said plate extends relative to said outlet.

3. In water-treating apparatus, the combination of a receptacle for a dry chemical, a feeder-plate reciprocable across the outlet of said receptacle and movable toward and away from said outlet, means for reciprocating said plate at a fixed rate of speed, a cam-device controlling the height at which said plate extends relative to said outlet, and means operating responsive to the rate of flow of water to the apparatus for controlling the position of said cam-device.

4. In water-treating apparatus, the combination of a receptacle for a dry chemical, a feeder-plate reciprocable across the outlet of said receptacle and movable toward and away from said outlet, means for reciprocating said plate at a fixed rate of speed, and fluid-pressure-operated differential mechanism controlled by the flow of water to the apparatus and operating responsive to the rate of flow of the water for varying the height at which said plate extends relative to said outlet.

5. In water-treating apparatus, the combination of a receptacle for a dry chemical, a feeder-plate receptacle across the outlet of said receptacle and movable toward and away from said outlet, means for reciprocating said plate at a fixed rate of speed, a cam-device controlling the height at which said plate extends relative to said outlet, and fluid-pressure-operated differential mechanism controlled by the flow of water to the apparatus and operating responsive to the rate of flow of the water for actuating said cam-device.

6. In water-treating apparatus the combination of a water-treating tank, a pipe through which the water is supplied to said tank and containing a constriction, a receptacle for a dry chemical, means for feeding the chemical from said receptacle for passage to the water to be treated operating at a fixed rate of speed, and fluid-pressure-operated differential mechanism communicating with said pipe at opposite sides of said constriction for varying the rate of flow of the chemical from said receptacle.

7. In water-treating apparatus the combination of a water-treating tank, a pipe through which the water is supplied to said tank and containing a constriction, a receptacle for a dry chemical, means for feeding the chemical from said receptacle for passage to the water to be treated operating at a fixed rate of speed, and means operating responsive to the rate of flow of water in said pipe to said tank for varying the rate of flow of the chemical from said receptacle comprising piston and cylinder mechanism, the cylinder of which communicates with said pipe at opposite sides of said constriction and means actuated by said piston for controlling said first-named means.

8. In water-treating apparatus, the combination of a water-treating tank, a pipe through which the water is supplied to said tank and containing a constriction, a receptacle for a dry chemical, a feeder-plate reciprocable across the outlet of said receptacle and movable toward and away from said outlet, means for reciprocating said plate at a fixed rate of speed, and fluid-pressure-operated differential mechanism communicating with said pipe at opposite sides of said constriction for varying the rate of flow of the chemical from said receptacle.

9. In water-treating apparatus the combination of a water-treating tank, a pipe through which the water is supplied to said tank and containing a constriction, a receptacle for a dry chemical, means for feeding the chemical from said receptacle for passage to the water to be treated operating at a fixed rate of speed, and means operating responsive to the rate of flow of water in said pipe to said tank for varying the rate of flow of the chemical from said receptacle comprising piston and cylinder mechanism, the cylinder of which communicates with said pipe at opposite sides of said constriction, spring means for yieldingly forcing said piston toward the high pressure end of said cylinder and means actuated by said piston for controlling said first-named means.

10. In water-treating apparatus, the combination of a receptacle for a dry chemical, a pan having an outlet, means for feeding the chemical from said receptacle to said pan, a substantially horizontal water-pipe to which water is supplied out of contact with the air having openings therealong opening into said pan for jetting the water into said pan, and means whereby the level of the liquid in said pan is maintained above said opening in said pipe.

11. In water-treating apparatus, the combination of a receptacle for a dry chemical and having an outlet, an outlet controlling member adjacent said outlet and spaced therefrom and movable up and down toward and away from said outlet, means for bodily reciprocating said member, means for jarring said receptacle, and means operating responsive to the rate of flow of water to the apparatus for varying the height at which said member extends relative to said outlet.

12. In water-treating apparatus, the combination of a water-treating tank, a receptacle for a dry chemical, means for feeding the chemical from said receptacle operating at a fixed rate of speed and comprising a power-driven device, means operating automatically by the flow of water to said tank to start said device into operation, a second receptacle into which said chemical discharges, means for supplying water to said second receptacle, a pump actuated by said device for pumping the mixture of water and chemical from said second receptacle for introduction into the water to be treated, and means operating responsive to the rate of flow of water to said tank for varying the rate of flow of chemical from said first-named receptacle.

13. In water-treating apparatus, the combination of a receptacle for a dry chemical, a feeder-plate extending directly below the outlet of said receptacle, plate-reciprocating means adapted to reciprocate the plate across said outlet at a fixed rate of speed and to which said plate is pivoted to one side of said outlet to adapt said plate to be swung toward and away from said outlet, and means operating responsive to the rate of flow of water to the apparatus for varying the angle of inclination of said plate.

BARTON S. SNOW.